United States Patent
Rydberg

(10) Patent No.: US 12,504,030 B2
(45) Date of Patent: Dec. 23, 2025

(54) SYSTEM FOR SECURING OBJECTS HAVING DIFFERENT COEFFICIENTS OF THERMAL EXPANSION

(71) Applicant: ATLAS MACHINE AND SUPPLY, INC., Louisville, KY (US)

(72) Inventor: Jeremy Rydberg, Louisville, KY (US)

(73) Assignee: ATLAS MACHINE AND SUPPLY, INC., Louisville, KY (US)

( * ) Notice: Subject to any disclaimer, the term of this patent is extended or adjusted under 35 U.S.C. 154(b) by 958 days.

(21) Appl. No.: 17/550,717

(22) Filed: Dec. 14, 2021

(65) Prior Publication Data

US 2023/0184272 A1   Jun. 15, 2023

(51) Int. Cl.
*F16B 7/04* (2006.01)
*B65H 3/52* (2006.01)

(52) U.S. Cl.
CPC ......... *F16B 7/0413* (2013.01); *B65H 3/5261* (2013.01); *F16B 2200/97* (2023.08); *Y10T 403/217* (2015.01)

(58) Field of Classification Search
CPC ...... F16B 7/0406; F16B 7/0413; F16B 7/182; F16B 2200/97; Y10T 403/21;
(Continued)

(56) References Cited

U.S. PATENT DOCUMENTS 4,167,351 A * 9/1979 Bindin ............ H01M 10/3909
285/329
5,370,596 A * 12/1994 Compagnon ............ F27B 9/24
403/29

(Continued)

FOREIGN PATENT DOCUMENTS

GB     2087503 A  *  5/1982  ............. F16B 31/04

OTHER PUBLICATIONS

"INVAR 36 Technical Data." High Temp Metals. Oct. 18, 2018, [online], [retrieved on Jun. 12, 2024] Retrieved from the Internet <URL: https://www.hightempmetals.com/techdata/hitemplnvar36data.php>.*

(Continued)

*Primary Examiner* — Amber R Anderson
*Assistant Examiner* — Kevin J Baynes
(74) *Attorney, Agent, or Firm* — Stites & Harbison, PLLC; James R. Hayne

(57) ABSTRACT

A system for securing objects having different coefficients of thermal expansion (CTE) includes a low-level CTE member having a first CTE, a high-level CTE member having a second CTE greater than the first CTE, and a compensation member positioned adjacent to the low-level CTE member and the high-level CTE member, the compensation member having a compensation CTE greater than the second CTE. The low-level CTE member includes an engagement surface and the high-level CTE member includes an engagement surface facing the engagement surface of the low-level CTE member such that, when the system is heated, expansion of the low-level CTE member and the high-level CTE member results in an increased distance between the engagement surface of the low-level CTE member and the engagement surface of the high-level CTE member. However, expansion of the compensation member maintains a secure connection between the low-level CTE member and the high-level CTE member.

7 Claims, 7 Drawing Sheets

(58) Field of Classification Search
CPC . Y10T 403/213; Y10T 403/217; C23C 2/003; F16F 15/322; A24B 3/14; B21D 43/08; B65H 3/5261
USPC .......................................... 411/909; 464/180
See application file for complete search history.

(56) References Cited

U.S. PATENT DOCUMENTS

| | | | | |
|---|---|---|---|---|
| 5,497,616 | A * | 3/1996 | Roberts | F23R 3/18 |
| | | | | 60/765 |
| 5,549,393 | A * | 8/1996 | Morando | F16C 33/16 |
| | | | | 384/208 |
| 6,554,904 | B1 * | 4/2003 | Gimpel | F16C 23/084 |
| | | | | 118/423 |
| 6,672,786 | B2 * | 1/2004 | Schenk | F01D 5/025 |
| | | | | 403/29 |
| 8,500,336 | B2 * | 8/2013 | Kouscheschi | F16C 33/6692 |
| | | | | 384/418 |
| 9,366,277 | B2 * | 6/2016 | Ingles | F16B 4/00 |
| 11,754,106 | B2 * | 9/2023 | Rothschild | F16B 21/086 |
| | | | | 29/428 |
| 2005/0223976 | A1 * | 10/2005 | Platzer | F16C 33/043 |
| | | | | 118/400 |
| 2009/0028478 | A1 * | 1/2009 | Kim | C23C 2/00 |
| | | | | 384/203 |
| 2011/0269558 | A1 * | 11/2011 | Yamashita | F16F 15/10 |
| | | | | 464/180 |

OTHER PUBLICATIONS

"Waspaloy." Special Metals. Jul. 30, 2021, [online], [retrieved on Jun. 12, 2024] Retrieved from the Internet <URL:https://www.specialmetals.com/documents/technical-bulletins/waspoloy.pdf>.*

"A-286 Technical Data". High Temp Metals. Oct. 10, 2018 [online], [retrieved on Jun. 12, 2024] Retrieved from the Internet <URL:https://www.hightempmetals.com/techdata/hitemplnvar36data.php>.*

* cited by examiner

SYSTEM FOR SECURING OBJECTS HAVING DIFFERENT COEFFICIENTS OF THERMAL EXPANSION

TECHNICAL FIELD

The present invention relates to systems which utilize materials with varying coefficients of thermal expansion (CTE). More specifically, the present invention relates to a system for securing together two or more objects having different CTE values through a compensation member having a higher CTE value.

SUMMARY OF THE INVENTION

The present invention is directed a system for securing together two or more objects having different CTE values through a compensation member having a higher CTE value.

According to some embodiments of the present invention, a system includes a low-level CTE member having a first CTE, a high-level CTE member having a second CTE greater than the first CTE, and a compensation member having a compensation CTE greater than the second CTE. The low-level CTE member includes an engagement surface, the high-level CTE member includes an engagement surface facing the engagement surface of the low-level CTE member, and the compensation member positioned adjacent to the low-level CTE member and the high-level CTE member. When the system is heated, expansion of the low-level CTE member and the high-level CTE member results in an increased distance between the engagement surface of the low-level CTE member and the engagement surface of the high-level CTE member, and expansion of the compensation member maintains a secure connection between the low-level CTE member and the high-level CTE member.

According to some exemplary embodiments, the low-level CTE member extends through the high-level CTE member.

According to some exemplary embodiments, the high-level CTE member includes a housing defining a hole with an interior surface and the low-level CTE member includes a pin extending through the hole of the housing, the pin including an exterior surface facing the interior surface of the hole. The compensation member includes a plurality of spacers positioned between the pin and the housing, each spacer positioned adjacent to the exterior surface of the pin and the interior surface of the housing so as to secure the pin within the housing. In such embodiments, when the system is heated, expansion of the pin and the housing results in an increased distance between the exterior surface of the pin and the interior surface of the housing and expansion of the plurality of spacers maintains a secure connection between the pin and the housing.

According to some specific exemplary embodiments, the plurality of spacers are arranged around the pin with relief slots defined between adjacent spacers.

According to some other exemplary embodiments, the high-level CTE member extends through the low-level CTE member.

According to some specific exemplary embodiments, the low-level CTE member includes at least two stacked plates, each plate defining a hole with the high-level CTE member extending through the hole of each plate.

According to some exemplary embodiments, compensation member defines a hole and the high-level CTE member extends through the hole of the compensation member.

According to some specific exemplary embodiments, the low-level CTE member includes a stack of two or more plates, the stack including an exterior surface and an interior surface opposite from the exterior surface. The stack also defines a hole through the two or more plates extending from the exterior surface to the interior surface. In these specific exemplary embodiments, the high-level CTE member includes a bolt including a head and a shaft, the head having a first engagement surface on the side of and facing the exterior surface of the stack and the shaft extending from the head and through the hole of the stack. The high-level CTE member further includes a nut positioned on the shaft of the bolt, the nut having a second engagement surface on the side of and facing the interior surface of the stack such that the bolt and the nut secure the two or more plates together with a compressive force. In these specific exemplary embodiments, the compensation member is positioned between the interior surface of the stack and the second engagement surface of the nut, such that, when the system is heated, expansion of the stack and the bolt results in an increased distance between the interior surface of the stack and the second engagement surface of the nut, and expansion of the compensation member maintains the compressive force applied by the bolt on the stack.

According to some exemplary embodiments, the high-level CTE member and the compensation member are embedded within the low-level CTE member.

According to some specific exemplary embodiments, the high-level CTE member includes an outer member including at a first end a head with an exterior engagement surface and a second end with an interior engagement surface, and an inner member including at a first end a head with an exterior engagement surface and a second end with an interior engagement surface facing the interior engagement surface of the second end of the outer member. In these embodiments, the low-level CTE member surrounds the head of the outer member and the head of the inner member.

According to some specific exemplary embodiments, the compensation member is positioned between the interior engagement surface at the second end of the outer member and the interior engagement surface at the second end of the inner member, such that, when the system is heated, expansion of the outer member and the inner member results in an increased distance between the interior engagement surface of the outer member and the interior engagement surface of the inner member, and expansion of the compensation member maintains a distance between the exterior engagement surface of the head of the outer member and the exterior engagement surface of the head of the inner member.

According to some specific exemplary embodiments, the head of the outer member includes an interior engagement surface opposite the exterior engagement surface of the head of the outer member and the head of the inner member includes an interior engagement surface opposite the exterior engagement surface of the head of the inner member.

According to some specific exemplary embodiments, the compensation member is positioned between the interior engagement surface at the second end of the outer member and the interior engagement surface at the second end of the inner member, such that, when the system is heated, expansion of the outer member and the inner member results in an increased distance between the interior engagement surface at the second end of the outer member and the interior engagement surface at the second end of the inner member, and expansion of the compensation member decreases a distance between the interior engagement surface of the head of the outer member and the interior engagement surface of the head of the inner member.

According to some specific exemplary embodiments, the inner member extends through the outer member and the low-level CTE member is cast around the outer member and the inner member such that the outer member and the inner member are embedded within the low-level CTE member.

According to some exemplary embodiments, the low-level CTE member includes a cylindrical body defining an internal cavity with a distal end of the body open to the internal cavity, and a journal extending away from the distal end of the cylindrical body, the journal having a sloped engagement surface and defining a through hole. The high-level CTE member includes an end bell positioned within the open distal end of the cylindrical body, the end bell defining a through hole and including a sloped engagement surface surrounding the through hole. The sloped engagement surface of the journal is in contact with the sloped engagement surface of the end bell such that the through hole of the journal is aligned with the through hole of the end bell. The high-level CTE member further includes a bolt including a head and a shaft extending from the head. The shaft extends through the through hole of the journal and through the through hole of the end bell, and the shaft terminates in an end positioned within the internal cavity of the cylindrical body. According to some of these embodiments, the compensation member is positioned around the shaft of the bolt and operably connected to the end bell and the end of the shaft of the bolt such that the bolt and the compensation member maintain a secure connection between the sloped engagement surface of the journal and the sloped engagement surface of the end bell. According to some of these embodiments, when the system is heated, expansion of the bolt results in an increased distance between the end of the shaft of the bolt and the end bell, and expansion of the compensation member maintains the secure connection between the sloped engagement surface of the journal and the sloped engagement surface of the end bell.

According to some specific exemplary embodiments, the bolt includes a main body including the head of the bolt and a first portion of the shaft closest to the head. The bolt further includes an extension body including a second portion of the shaft that includes the end of the shaft of the bolt. According to some of these embodiments, the extension body has a CTE less than the compensation CTE.

According to some exemplary embodiments, the system further includes a cap connected to an end of the compensation member opposite from the end bell. The cap is also connected to the end of the shaft of the bolt.

According to some exemplary embodiments, a roll assembly utilizing members having different CTEs includes a cylindrical body having a first CTE, the body defining an internal cavity with a distal end of the body open to the internal cavity; an end bell positioned within the open distal end of the body, the end bell defining a through hole and including a sloped engagement surface surrounding the through hole; a journal positioned against the end bell with a sloped engagement surface of the journal in contact with the sloped engagement surface of the end bell, the journal defining a through hole aligned with the through hole of the end bell; a bolt having a second CTE greater than the first CTE, the bolt including a head and a shaft extending from the head through the through hole of the journal and the through hole of the end bell, the shaft terminating in an end positioned within the internal cavity of the body; and a compensation member having a compensation CTE greater than the second CTE, the compensation member positioned around the shaft of the bolt and operably connected to the end bell and the end of the shaft of the bolt such that the bolt and the compensation member maintain a secure connection between the sloped engagement surface of the journal and the sloped engagement surface of the end bell. According to some of these embodiments, when the roll assembly is heated, expansion of the bolt results in an increased distance between the end of the shaft of the bolt and the end bell, and expansion of the compensation member maintains the secure connection between the sloped engagement surface of the journal and the sloped engagement surface of the end bell.

According to some specific exemplary embodiments, the bolt includes a main body including the head of the bolt and a first portion of the shaft closest to the head, the main body having a CTE less than the compensation CTE; and an extension body including a second portion of the shaft that includes the end of the shaft of the bolt, the extension body having a CTE less than the compensation CTE.

According to some other specific exemplary embodiments, a spacer having a CTE greater than the CTE of the main body of the bolt surrounds the first portion of the shaft of the bolt and is positioned and compressed between the second portion of the shaft and the journal such that, when the roll assembly is heated, expansion of the main body of the bolt results in an increased distance between the second portion of the shaft of the bolt and the journal, and expansion of the spacer maintains the compression of the spacer between the second portion of the shaft and the journal.

DESCRIPTION OF THE INVENTION

The present invention is directed to a system for securing together two or more objects having different CTE values through a compensation member having a higher CTE value.

In one exemplary implementation of the present invention, a system utilizes varying CTE materials as a means of balancing the radial growth of different components, such as when a pin is held within a housing. In a typical two-material CTE system (i.e., where the pin is directly held within the housing) if the material of the pin has a lower CTE than the material of the housing, upon increasing the temperature of the system, the higher CTE material of the housing would expand more than the lower CTE material of the pin and an increasing gap would form between the pin and the housing, which would allow the pin to slip loose of the housing.

Figure 2:
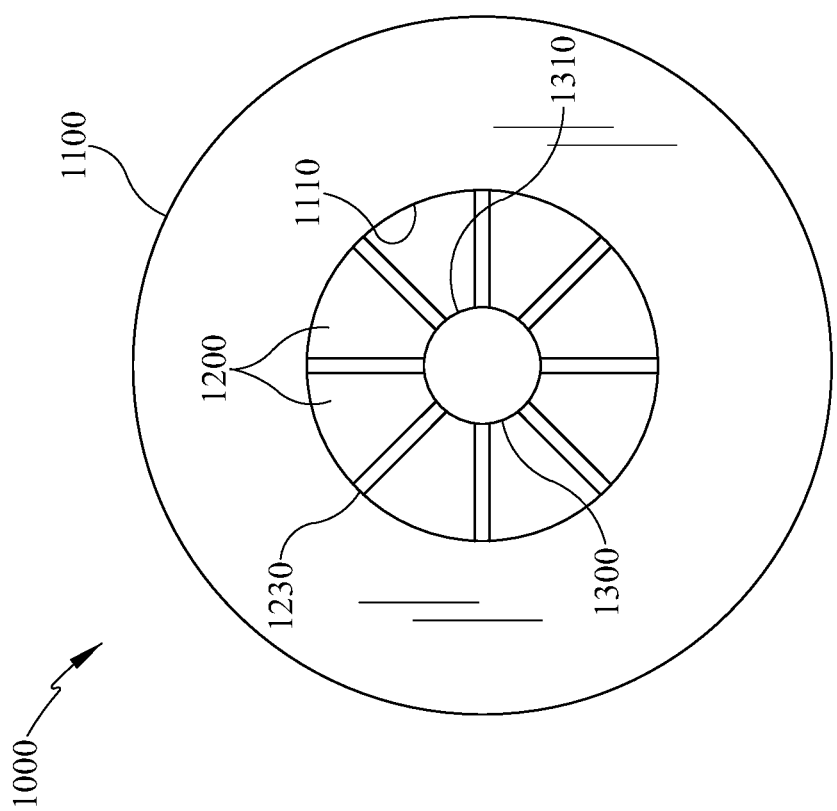
FIG. 2 is a front view of the system of FIG. 1.
Figure 1:
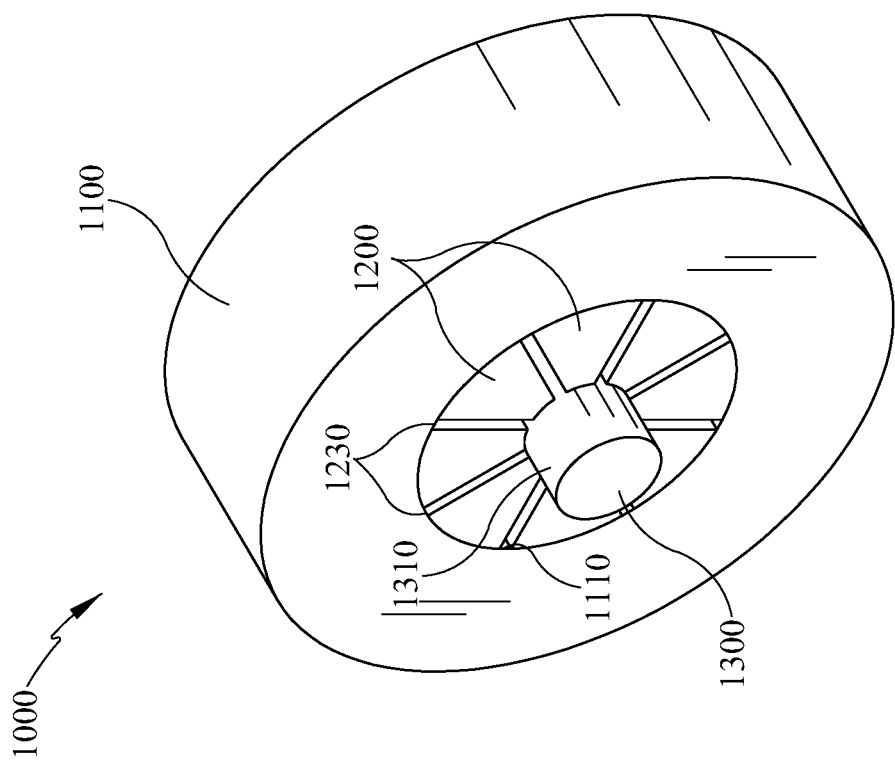
FIG. 1 is a perspective view of a first exemplary embodiment of a system of the present invention in which a pin is secured within a housing by a plurality of spacers.

Referring first to FIGS. 1 and 2, in one exemplary embodiment of the present invention, a system 1000 includes a low-level CTE member in the form of a pin 1300 that is maintained within a high-level CTE member in the form of a housing 1100 through the use of a plurality of compensation members, or spacers 1200, positioned between the pin 1300 and the housing 1100.

More specifically, the housing 1100 defines a hole with an interior surface 1110 and the pin 1300 extends through the hole such that there is a distance between an exterior surface 1310 of the pin 1300 and the interior surface 1110 of hole in the housing 1100. The plurality of spacers 1200 are positioned between the pin 1300 and the housing 1100 with each spacer 1200 positioned adjacent to the exterior surface 1310 of the pin 1300 and the interior surface 1110 of the housing 1100 so as to secure the pin 1300 within the housing 1100.

The material of the pin 1300 has a lower CTE than the material of the housing 1100, similar to the typical two-material CTE system discussed above. As such, upon heating the system 1000, the higher CTE material of the housing 1100 expands more than the lower CTE material of the pin 1300, and the distance between the interior surface 1110 of the hole of the housing 1100 and the exterior surface 1310 of the pin 1300 increases. However, in the exemplary embodiment shown in FIGS. 1 and 2, the material of the spacers 1200 has a CTE greater than both the low-level CTE material of the pin 1300 and the high-level CTE material of the housing 1100. As such, when the system 1000 is heated, the spacers 1200 expand more than the expansion of the housing 1100 and maintain a secure connection between the pin 1300 and the housing 1100. That is to say, the pin 1300 is held in place within the housing 1100.

In a preferred embodiment, the rate and overall expansion of the spacers 1200 is designed to substantially match the increase in the distance between the interior surface 1110 of the hole of the housing 1100 and the exterior surface 1310 of the pin 1300. As such, the compressive force applied by the spacers 1200 on the pin 1300 remains substantially the same across a wide range of temperatures. However, in other embodiments, the compressive force applied the spacers may increase as the temperature increases.

The exemplary embodiment shown in FIGS. 1 and 2 includes eight spacers 1200 arranged around the pin 1300 with relief slots 1230 defined between adjacent spacers 1200. These slots 1230 account for the lateral grow of the spacers 1200. That is to say, as the system is heated and the spacers 1200 expand, the slots 1230 will become narrower. The particular number of spacers and/or size of slots is not limited and can be determined based on the overall design considerations.

Furthermore, while in some embodiments each of the spacers is made of the same material (e.g., 316L steel), in some other embodiments one or more of the spacers can be made of a different material.

The system shown in FIGS. 1 and 2 is merely exemplary of a system in which the radial growth of materials is matched during changes in temperature. As such, the pin and housing can, in certain implementations of the present invention be a bushing for a bearing or other similar orifice. To this end, depending on design considerations, the particular dimensions and CTE materials of the pin, the housing, and/or each of the spacers can be chosen to provide for any particular tightness of fit including, for example, an interference fit or a loose fit. In some embodiments, the fit is configured to change in a particular manner during heating. For example, a person of ordinary skill should readily understand how to allow for the fit to get tighter as the system is heated and control how tight the fit becomes.

In another exemplary implementation of the present invention, a system utilizes varying CTE materials as a means of balancing longitudinal growth of different components, such as when a bolt and nut are used to keep two plates together. In a typical two-material CTE system (i.e., where a bolt and nut are directly in contact with both of the plates) if the material of the bolt has a higher CTE than the material of the plates, upon increasing the temperature of the system, the higher CTE material of the bolt would expand more than the lower CTE material of the plates and therefore the head of the bolt and the nut would move away from the two plates, which would allow the two plates to move longitudinally along the bolt.

Figure 3:
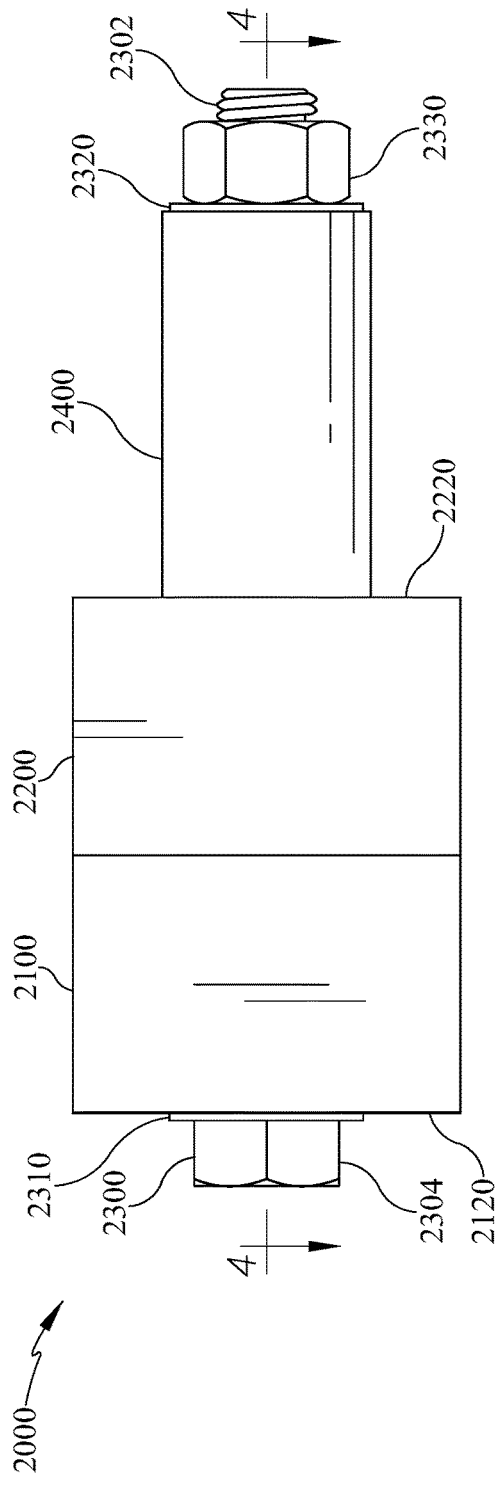
FIG. 3 is side view of a second exemplary embodiment of a system of the present invention in which two plates are held together by a bolt and a nut by a spacer positioned around the bolt.
Figure 4:
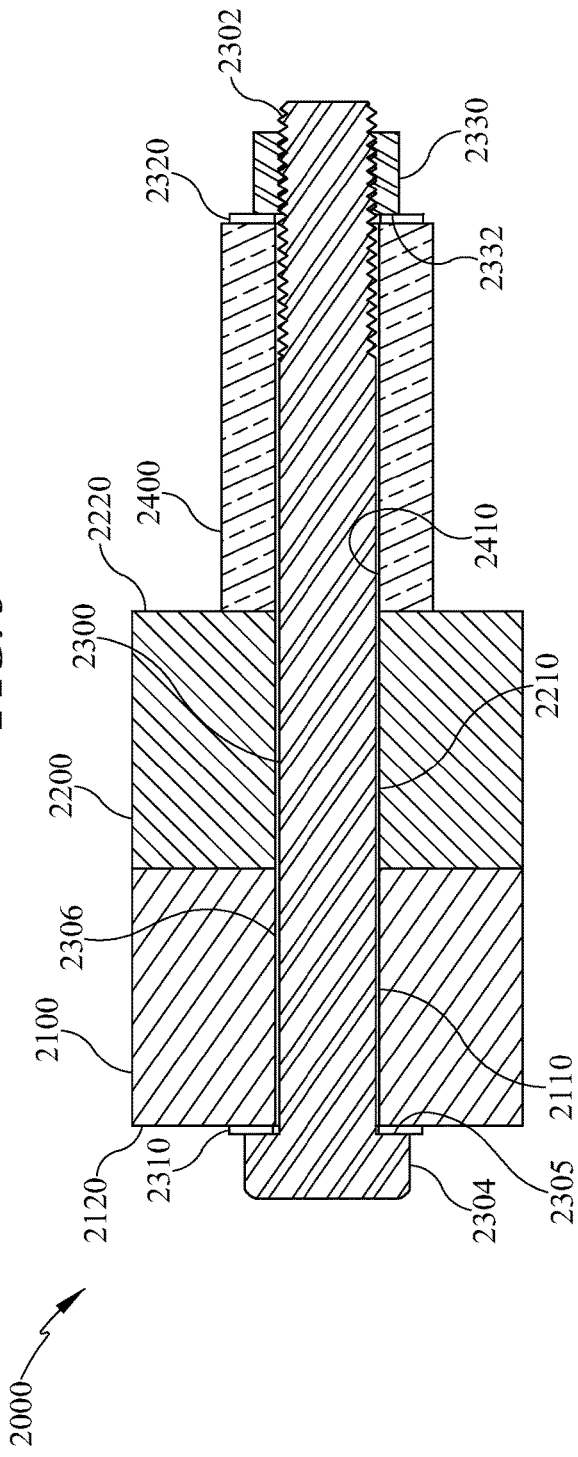
FIG. 4 is a cross-sectional view of the system of FIG. 3.

Referring now to FIGS. 3 and 4, in another exemplary embodiment of the present invention, a system 2000 includes two stacked plates 2100, 2200 that are held together with a bolt 2300 and a nut 2330 with a compensation member, or spacer 2400 positioned around the bolt 2300.

In the exemplary embodiment shown, where the stack of plates includes two plates 2100, 2200, an exterior surface 2120 of one plate 2100 is the exterior surface of the stack of plates and an interior surface 2220 of the other plate 2200 is the interior surface of the stack of plates. Each of the plates 2100, 2200 defines a respective hole 2110, 2210 through which the bolt 2300 extends. In other words, the stack of plates 2100, 2200 collectively defines a hole through the plates which extends from the exterior surface 2120 to the interior surface 2220. Likewise, the spacer 2400, which is positioned adjacent to the interior surface 2220 of the stack of plates 2100, 2200 also defines a hole 2410 through which the bolt 2300 extends.

The bolt 2300 includes a head 2304 with an engagement surface 2305 on the side of and facing the exterior surface 2120 of the stack of plates 2100, 2200 and a shaft 2306 extending away from the engagement surface 2305 of the head 2304 so as to extend through the holes 2110, 2210 of the plates 2100, 2200 and the hole 2410 of the spacer 2400. In this exemplary embodiment, only a distal end 2302 of the shaft 2306 is threaded, but the entirety of the shaft 2306 could also be threaded in other embodiments. A nut 2330 is then positioned on the threaded end 2302 of the bolt 2300 with an engagement surface 2332 of the nut 2330 that is on the side of and facing the interior surface 2220 of the stack of plates 2100, 2200. As shown in FIGS. 3 and 4, in this exemplary embodiment, the spacer 2400 is positioned between the interior surface 2220 of the stack of plates 2100, 2200 and the engagement surface 2332 of the nut 2330. Washers 2310, 2320 are also included on either side of the stack of plates 2100, 2200. However, the particular arrangement of the plates 2100, 2200, spacer 2400, and washers 2310, 2320 is not limited so long as each of the members is positioned between the engagement surface 2305 of the head 2304 of the bolt 2300 and the engagement surface 2332 of the nut 2330. Furthermore, it is contemplated that washers are not necessary in all embodiments.

Regardless, the nut 2330 is tightened onto the bolt 2300 such that the first plate 2100, the second plate 2200, and the spacer 2400 are secured together by a compressive force applied by the bolt 2300 and the nut 2330.

The material of the bolt 2300 has a higher CTE than the material of the two plates 2100, 2200, similar to the typical two-material CTE system discussed above. As such, upon increasing the temperature of the system 2000, the higher CTE material of the bolt 2300 expands more than the lower CTE material of the plates 2100, 2200 and therefore a distance between the head 2304 of the bolt 2300 and the threaded end 2302 of the bolt 2300 (i.e., the engagement surface 2305 of the head 2304 of the bolt 2300 and the engagement surface 2332 of the nut 2330) increases more than the thickness of the plates 2100, 2200 increases. However, in the exemplary embodiment shown in FIGS. 3 and 4, the material of the spacer 2400 has a CTE higher than both the low-level CTE material of the two plates 2100, 2200 and the high-level CTE material of the bolt 2300. As such, when the system 1000 is heated, the spacer 2400 expands more than the expansion of the bolt 2300 to thereby maintain a secure connection between the bolt 2300, the nut 2330, and the plates 2100, 2200. In other words, expansion of the bolt 2300 results in an increased distance between the engagement surface 2305 of the head 2304 of the bolt 2300 and the engagement surface 2332 of the nut 2330, but the expansion of the spacer 2400 maintains the compressive force applied by the bolt 2300 and the nut 2330 on the stack of the plates 2100, 2200.

With respect to the exemplary embodiment shown in FIGS. 3 and 4, where the spacer 2400 is positioned adjacent to the interior surface 2220 of the stack of plates 2100, 2200, it can also be said that the increased distance between the interior surface 2220 of the stack of plates 2100, 2200 and the engagement surface 2332 of the nut 2330 is compensated for by the expansion of the spacer 2400. However, alternate positions of the spacer 2400 relative to the plates 2100, 2200 would result in expansion of the spacer 2400 compensating for an increased distance between other surfaces of the system 2000.

In a preferred embodiment, the rate and overall expansion of the spacer 2400 is designed to substantially match the difference in the rate of growth of the length of the bolt 2300 as compared to the rate of growth of the thickness of the two plates 2100, 2200. As such, the compressive force applied by the head 2304 of the bolt 2300 and the nut 2330 on the two plates 2100, 2200 remains substantially the same at all temperatures.

The exemplary embodiment shown in FIGS. 3 and 4 includes two plates 2100, 2200, but the number of plates is not particularly limited. Furthermore, while in some embodiments, each of the plates are made of the same material (e.g., SiC), in some other embodiments, each of the plates can be made of a different material. In such embodiments, the configuration of the system would be designed based on the particular CTE of each of the plates. Likewise, any expansion of the washers 2310, 2320 and/or the nut 2330 can also be accounted for in the design of the system.

The system shown in FIGS. 3 and 4 is merely exemplary of a system in which the longitudinal growth of materials must be matched during changes in temperature. As such, a person of ordinary skill can readily choose the particular dimensions and CTE materials depending on the design considerations.

In yet another exemplary implementation of the present invention, one or more subassemblies including varying CTE materials are embedded within a substrate to avoid internal tension within the substrate and/or apply a desired internal compression during changes in temperature. One common issue with steel reinforced concrete is that when heated, the steel reinforcement within the concrete expands more than the surrounding concrete. At minimum, this reduces the additional pressed strength provided by the steel, but in more extreme situations, the steel can expand to the point where the embedded steel actually forces the concrete into tension increasing the occurrence of cracks and failure of the concrete.

Figure 5:
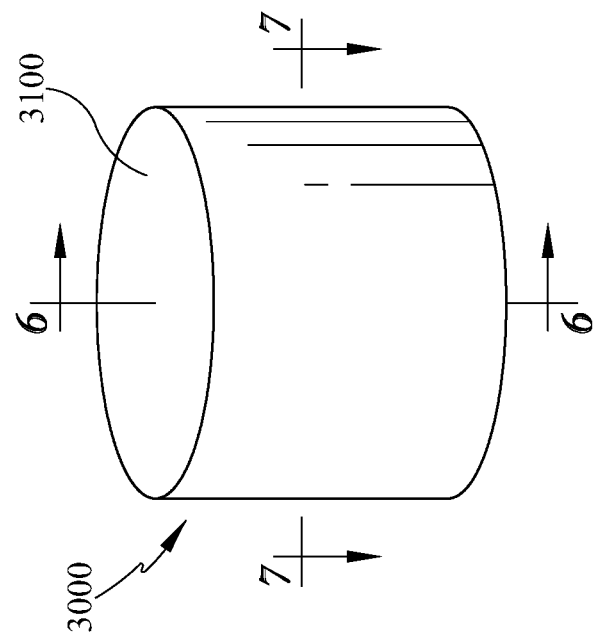
FIG. 5 is a perspective view of a third exemplary embodiment of a system of the present invention in which an exemplary subassembly is embedded within a substrate.
Figure 7:
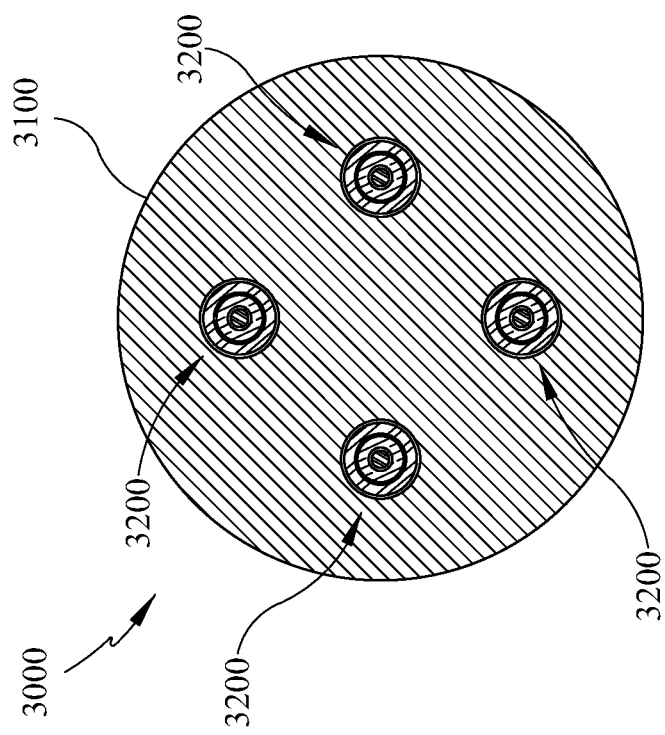
FIG. 7 is a cross-sectional view of the block of FIG. 5 taken along line 7-7 showing four of the subassemblies of the present invention embedded within the substrate.
Figure 6:
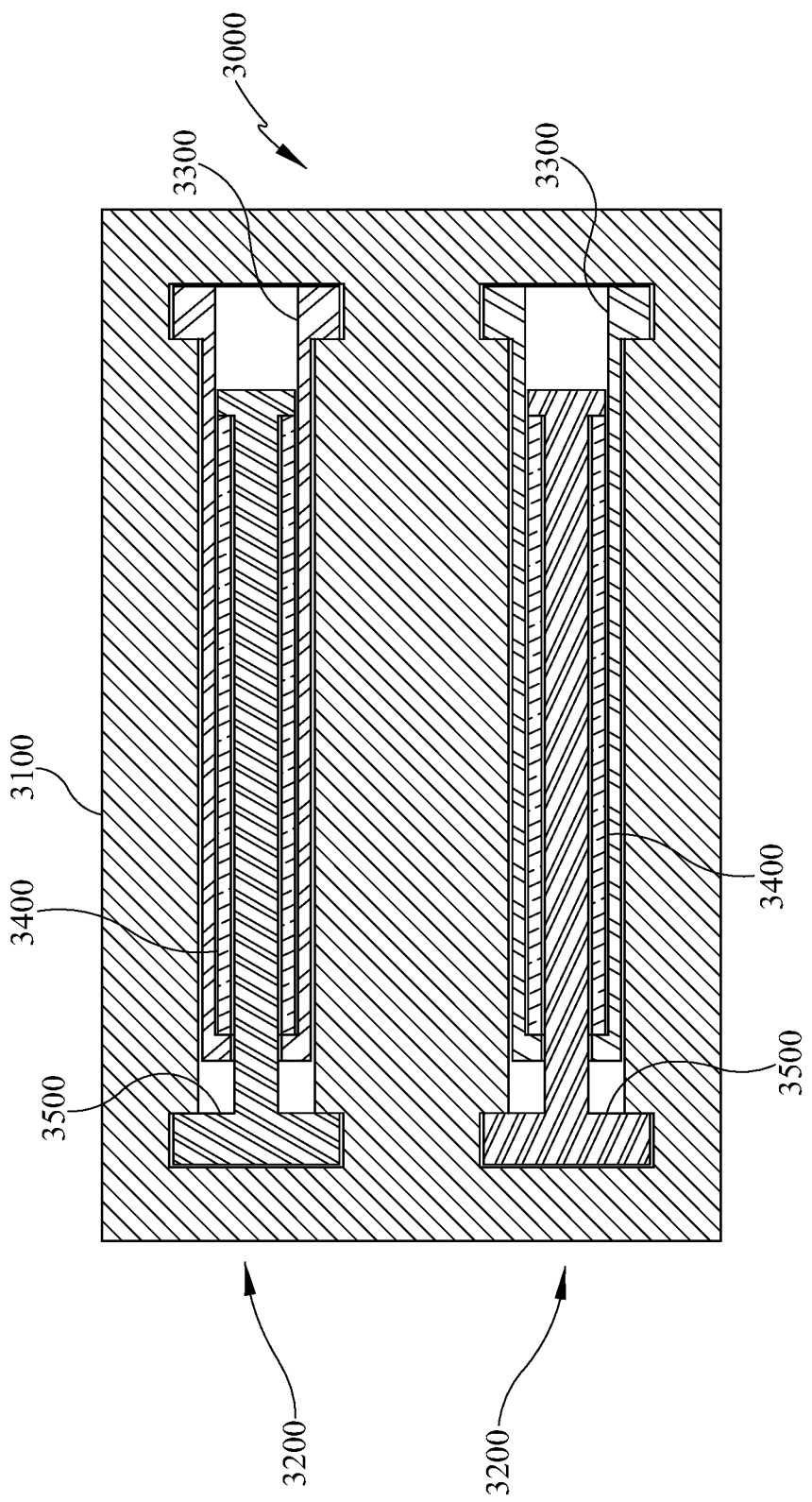
FIG. 6 is a cross-sectional view of the block of FIG. 5 taken alone line 6-6 showing two of the subassemblies of the present invention embedded within the substrate.

Referring now to FIGS. 5-7, in another exemplary embodiment of the present invention, a system 3000 includes one or more (four illustrated) subassemblies 3200 embedded within a substrate 3100 that has a relatively low CTE.

Figure 8:
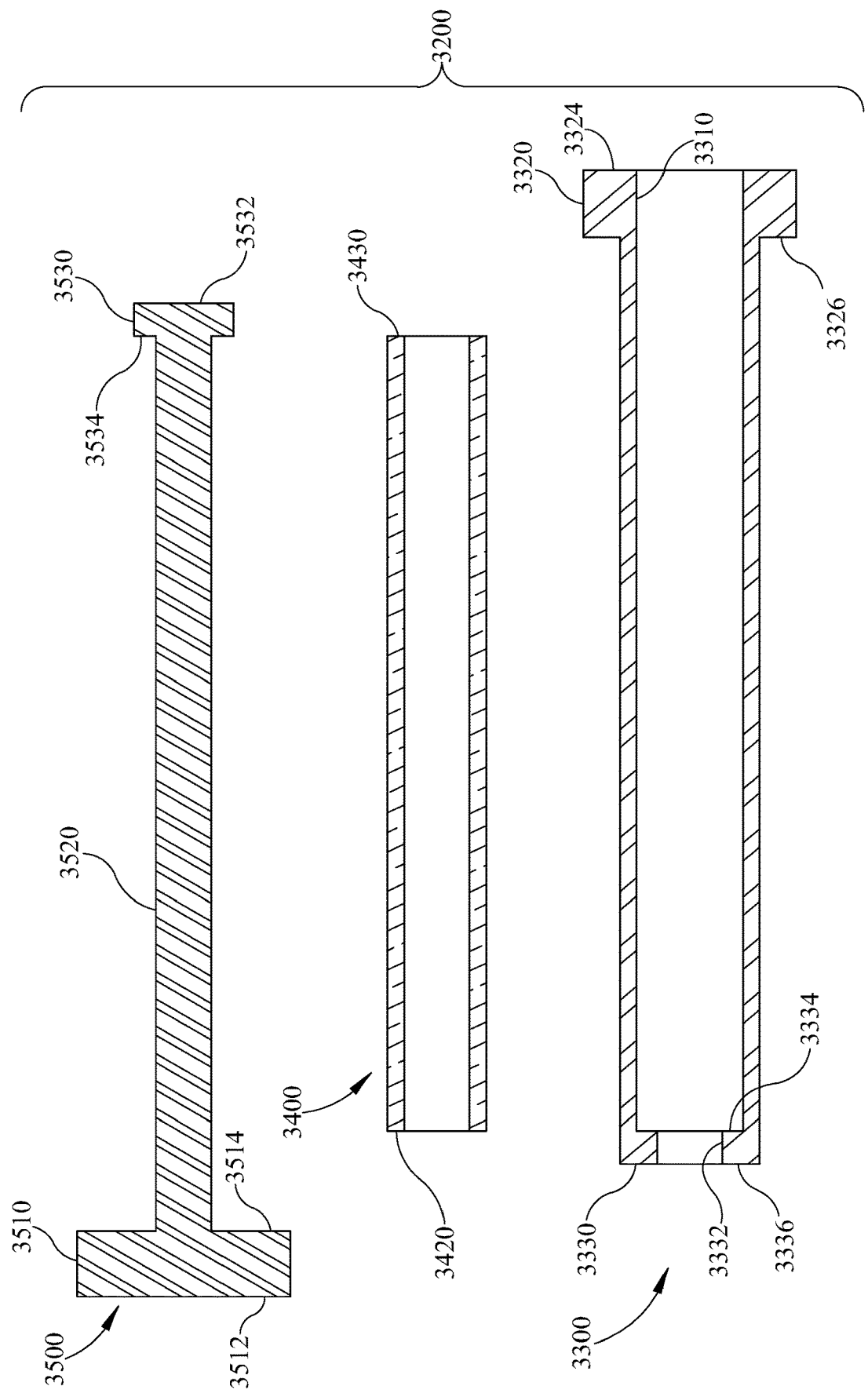
FIG. 8 is an exploded view of one exemplary subassembly of FIG. 6.

Referring now to FIG. 8, a subassembly 3200 made in accordance with the present invention, includes an outer member 3300, an inner member 3500 that partially extends through the length of the outer member 3300, and a spacer positioned between the body 3520 of the inner member 3500 and the outer member 3300, as discussed further below.

The outer member 3300 is generally cylindrical and defines an internal cavity 3310 extending along the length of the outer member 3300. The outer member 3300 includes at a first end a head 3320 with an exterior surface 3324 and an interior surface 3326, and the internal cavity 3310 of the outer member 3300 is open at the exterior surface 3324 of the head 3320. At a second end 3330 of the outer member 3300 opposite from the head 3320, an opening 3332 is defined which extends through the second end 3330 from an exterior surface 3336 to an interior surface 3334 of the second end 3330. The opening 3332 in the second end 3330 connects to the internal cavity 3310 but is narrower than the internal cavity 3310.

The inner member 3500 is generally barbell shaped with a first head 3510 with an exterior surface 3512 and an interior surface 3514, a second head 3530 with an exterior surface 3532 and an interior surface 3534, and a body 3520 extending between the interior surface 3514 of the first head 3510 and the interior surface 3534 of the second head 3530. The first head 3510 of the inner member 3500 is similar in size to the head 3320 of the outer member 3300, but the second head 3530 of the inner member 3500 is smaller than the first head 3510 of the inner member 3500 and the head 3320 of the outer member 3300. As perhaps best shown in FIG. 6, the second head 3530 of the inner member 3500 is small enough to fit within the internal cavity 3310 of the outer member 3300, but the second head 3530 of the inner member 3500 is larger than the opening 3332 defined at the second end 3330 of the outer member 3300. However, the body 3520 of the inner member 3500 is sized to fit through the opening 3332 at the second end 3330 of the outer member 3300. The second head 3530 of the inner member 3500 is therefore able to move longitudinally within the internal cavity 3310 of the outer member 3300 as the body 3520 slides through the opening 3332 at the second end 3330 of the outer member 3300.

The spacer 3400 is configured to surround the body 3520 of the inner member 3500 and, as shown in FIG. 6, at least partially fill the space between the body 3520 of the inner member 3500 and the inner wall of the internal cavity 3310 of the outer member 3300. A first end 3420 of the spacer 3400 is positioned adjacent to the opening 3332 at the second end 3330 of the outer member 3300 and a second end 3430 of the spacer 3400 is positioned adjacent to the second head 3530 of the inner member 3500. More specifically, the spacer 3400 is positioned adjacent to and extending between the interior surface 3334 of the second end 3330 of the outer member 3300 and the interior surface 3534 of the second head 3530 of the inner member 3500.

Manufacture of the subassembly 3200 can be accomplished through a variety of means. For example, with respect to the inner member 3500, in some embodiments, one or more of the heads 3510, 3530 can be attached to the body 3520 via a threaded connection such that the heads 3510, 3530 are removable in order to place the spacer 3400 on the body 3520 of the inner member 3500. To this end, one or more of the heads 3510, 3530 can be a nut or other threaded connector. In some other embodiments, the heads 3510, 3530 can be welded to the body 3520 after the spacer 3400 is placed on the body 3520 of the inner member 3500. In still other embodiments, the spacer 3400 is placed around the body 3520 of the inner member 3500 after each of the heads 3510, 3530 are already connected to the body 3520.

The placement of the inner member 3500 and spacer 3400 within the outer member 3300 can likewise be accomplished via one or more threaded and/or welded connections of the heads 3510, 3530 of the inner member 3500 after the inner member 3500 and spacer 3400 are positioned within the outer member 3300. For example, in some embodiments, the first head 3510 is operably connected to the body 3520 via a threaded connection and initially removed in order to allow the spacer 3400 to slide onto the body 3520 of the inner member 3500. The spacer 3400 and inner member 3500 are then positioned into the internal cavity 3310 of the outer member 3300 until the end of the body 3520 of the inner member 3500 onto which the first head 3510 will be connected extends through the opening 3332 at the second end 3330 of the outer member 3300. The first head 3510 is then screwed onto the exposed end of the inner member 3500 thereby forming the subassembly 3200.

Referring now to FIGS. 5 and 6, one or more subassemblies 3200 constructed according to the present invention are then embedded within the substrate 3100 such that the substrate 3100 surrounds the head 3320 of the outer member 3300 and the head 3510 of the inner member 3500. For example, the substrate 3100 can be cast around the subassemblies 3200. In some embodiments, the subassemblies 3200 are first wrapped in a material which prevents the substrate 3100 from filling the portion of the internal cavity 3310 of the outer member 3300 not filled by the inner member 3500 and spacer 3400 as well as the space between the first head 3510 of the inner member 3500 and the second end 3330 of the outer member 3300. For example, a soft material such as fiberglass tape can provide sufficient protection while still allowing the relative movement of the outer member 3300 and the inner member 3500 discussed below. Alternatively, a wax, plastic, or other similar material can be used during casting and later melted to maintain the spaces.

The material of the outer member 3300 and the inner member 3500 has a higher CTE than the material of the substrate 3100, similar to the typical steel reinforced concrete discussed above. As such, upon increasing the temperature of the system, the higher CTE material of the outer member 3300 and the inner member 3500 expands more than the lower CTE material of the substrate 3100. In other words, expansion of the outer member 3300 and the inner member 3500 results in an increased distance between the interior surface 3334 of the second end 3330 of the outer member 3300 and the interior surface 3534 of the second head 3530 of the inner member 3500. However, the material of the spacer 3400 has a higher CTE than the materials of the outer member 3300 and the inner member 3500. As such, upon increasing the temperature of the system, the spacer 3400 expands more than the expansion of the outer member 3300 and the inner member 3500. As the spacer 3400 grows in length, it effectively pushes apart the second end 3330 of the outer member 3300 and the second head 3530 of the inner member 3500, thereby causing the head 3320 of the outer member 3300 and the first head 3510 of the inner member 3500 to either stay in position relative to one another or move towards each other.

In some embodiments, the rate and overall expansion of the spacer 3400 is designed to substantially match the collective rate of growth in the length of the outer member 3300 and the inner member 3500 such that a distance between the head 3320 of the outer member 3300 and the second head 3530 of the inner member 3500 remains substantially the same to thereby maintain a secure connection between the outer member 3300, the inner member 3500, and the substrate 3100. As the overall length of the subassemblies 3200 within the substrate 3100 remains substantially the same at all temperatures, the position of the head 3320 of the outer member 3300 and the head 3510 of the inner member 3500 within the substrate 3100 (i.e., the distance between the exterior surface 3324 of the head 3320 of the outer member 3300 and the exterior surface 3512 of the head 3510 of the inner member 3500) remains the same and therefore no internal tension forces are applied to the substrate 3100.

In some other embodiments, the rate and overall expansion of the spacer 3400 is designed to exceed the collective rate of growth in the length of the outer member 3300 and the inner member 3500 such that a distance between the head 3320 of the outer member 3300 and the second head 3530 of the inner member 3500 decreases to thereby maintain a secure connection between the outer member 3300, the inner member 3500, and the substrate 3100. As the overall length of the subassemblies 3200 within the substrate 3100 decreases with increased temperatures, the position of the head 3320 of the outer member 3300 and the head 3510 of the inner member 3500 within the substrate 3100 (i.e., the distance between the interior surface 3326 of the head 3320 of the outer member 3300 and the interior surface 3514 of the head 3510 of the inner member 3500) decreases and therefore an internal compressive force is applied to the substrate 3100. This is particularly beneficial for applications where the system is heated when under operating conditions when the substrate is experiencing stress loads and would benefit from the additional strength provided by the internal compression.

The system shown in FIGS. 5-8 is merely exemplary of a system in which subassemblies including varying CTE materials are embedded within a substrate. While in some embodiments, each of the outer member and the inner member are made of the same material (e.g., H13 steel), in some other embodiments, the outer member and the inner member can be made of a different materials. A person of ordinary skill can readily choose the particular dimensions and CTE materials depending on the design considerations.

In yet another exemplary implementation of the present invention, multiple components having varying CTE values are utilized within a roll assembly configured for submersion in a heated bath, such as a roll assembly used in a galvanizing line assembly. In a typical metal coating line assembly, a metal layer (e.g. zinc) is plated on a steel sheet by submerging the steel sheet in a hot dipping bath of the molten plating metal. More specifically, a steel sheet is continuously supplied and submerged into molten zinc contained within a zinc pot, and the steel sheet is turned upward by one or more roller assemblies before exiting the molten zinc. Molten zinc is a highly corrosive environment, and, as such, it is considered preferably that certain components of the roll assembly are made of a material that resists wear and corrosion, such as a ceramic. However, ceramics are typically brittle and therefore it has not been considered feasible for the entire roll assembly to be made entirely of ceramic. As such, some roll assemblies include only a journal made of ceramic while the rest of the roller is made of other materials, such as metal. The molten zinc contained within a zinc pot is kept at high temperatures, however, and so in a typical system when the roller is submerged into the zinc, the metal components expand more than the ceramic components, creating issues with respect to the connection between the ceramic journal and the rest of the roller.

Figure 9:
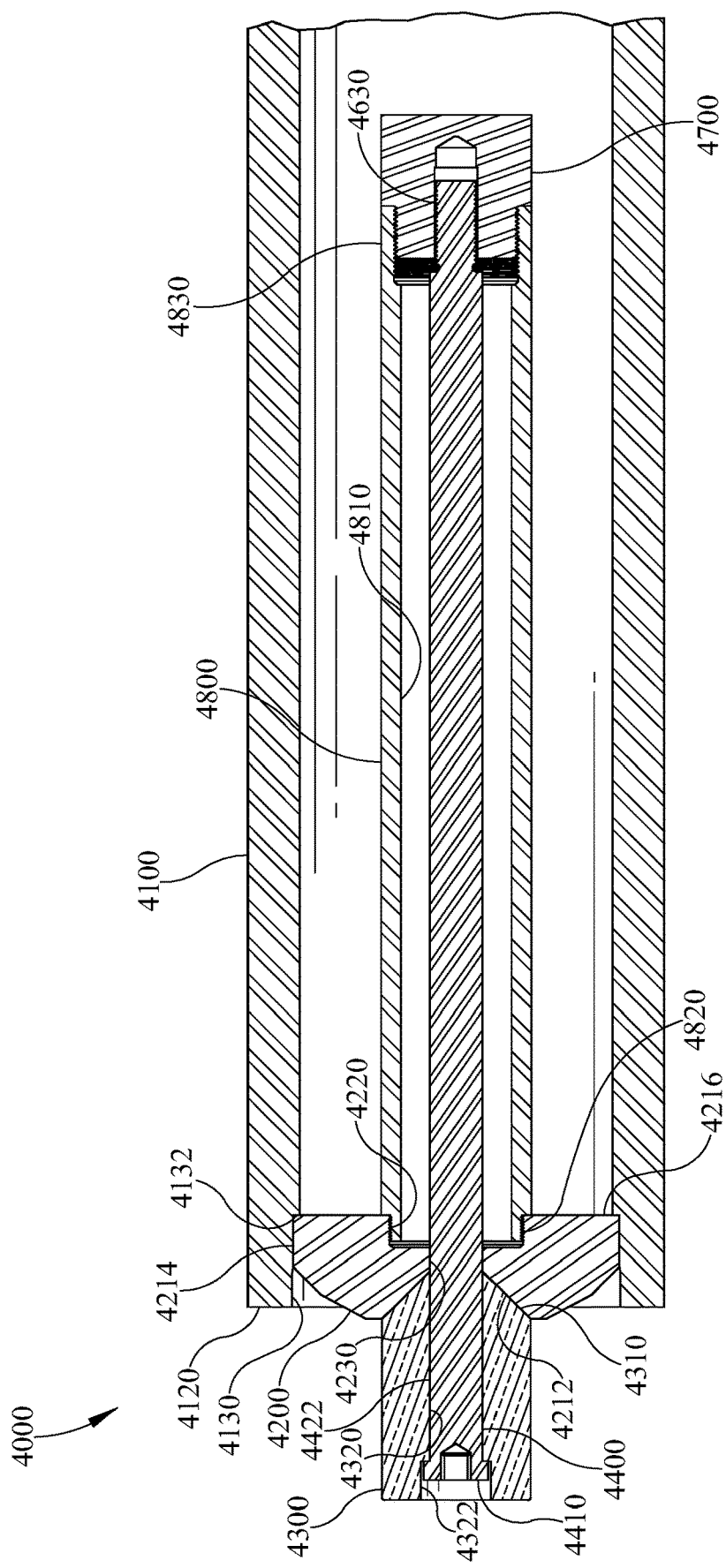
FIG. 9 is a cross-sectional view of a fourth exemplary embodiment of a system of the present invention in the form of a roll assembly.

Referring now to FIG. 9, a roll assembly 4000 of the present invention includes a cylindrical roll 4100 with two journals (one journal 4300 shown in FIG. 9) extending from either end of the roll 4100 along the longitudinal axis of the roll 4100. According to the present invention, the roll 4100 and the journals 4300 are both made of a material with a relatively low CTE, such as a ceramic, but additional components of the roll assembly 4000, which are discussed below, are provided to operably connect the journal 4300 to the roll 4100 in order to maintain adequate connection between the journal 4300 and the roll 4100 throughout the heat cycling that occurs during use.

As shown in FIG. 9, the roll 4100 defines a cavity with an internal surface 4130 with an end 4120 of the roll 4100 that is open to the cavity. A lip 4132 is formed along the internal surface 4130 of the cavity a distance away from the end 4120 of the roll 4100.

An end bell 4200 sits against the lip 4132 within the cavity of the roll 4100. In particular, the end bell 4200 includes an exterior surface 4214 which is positioned adjacent to the internal surface 4130 of the cavity of the roll 4100 with a leading surface 4216 of the end bell 4200 sitting against the lip 4132 of the roll 4100. The end bell 4200 is then affixed to the roll 4100, as discussed further below. The end bell 4200 further defines a tapered cavity 4212 and a cylindrical through hole 4230 which extends through the end bell 4200. More specifically, the tapered cavity 4212 surrounds the through hole 4230.

The journal 4300 sits within the tapered cavity 4212 of the end bell 4200. More specifically, an external tapered surface 4310 of the journal 4300 is configured to mate with the tapered cavity 4212 of the end bell 4200. The journal 4300 further defines a counterbored through hole 4320 which is aligned with the through hole 4230 of the end bell 4200.

An inner tube 4800 is affixed to the end bell 4200. Specifically, in this exemplary embodiment, the end bell 4200 defines a cavity 4220 recessed in the leading surface 4216 and a first end 4820 of the inner tube 4800 is positioned within the cavity 4220. The inner tube 4800 is thereby affixed to the end bell 4200, as discussed further below. The inner tube 4800 extends a distance away from the end bell 4200 substantially along the longitudinal axis of the roll 4100 with a cap 4700 affixed to a second end 4830 of the inner tube 4800, as discussed further below.

A bolt 4400 extends through the journal 4300, the end bell 4200, and the inner tube 4800. More specifically, a head 4410 of the bolt 4400 is contained within the counterbore 4322 of the journal 4300. A shaft 4422 of the bolt 4400 extends from the head 4410 of the bolt 4400, through the through hole 4320 of the journal 4300, through the through hole 4230 of the end bell 4200, and into an internal cavity 4810 of the inner tube 4800. In other words, the inner tube 4800 defines a hole and the bolt 4400 extends through the hole (i.e., internal cavity 4810) of the inner tube 4800. An end 4630 of the shaft 4422 is then affixed to the cap 4700, as discussed further below.

With respect to the connections between the end bell 4200 and the roll 4100, the inner tube 4800 and the end bell 4200, the cap 4700 and the inner tube 4800, and the bolt 4400 and the cap 4700, some threaded connections are shown in the embodiment shown in FIG. 9. However, it is contemplated that other means of connecting the parts (e.g., shrink fitting, welding, and the like) are also possible without departing from the spirit and scope of the present invention.

However, the bolt 4400 is used to hold the journal 4300 firmly within the end bell 4200. In a typical two-material CTE system in which a higher CTE bolt is used to directly connect a lower CTE journal to the roller, upon submerging a roller into a zinc pot, the bolt would extend in length more than the journal would expand, thereby loosening the connection of the journal to the roller.

As previously mentioned, the roll 4100 and the journal 4300 are both made of a material with a relatively low CTE, such as a ceramic. Each of the end bell 4200, bolt 4400, cap 4700, and inner tube 4800 are made of materials have higher CTE values as compared to low CTE of the roll 4100 and journal 4300. Furthermore, the material of the inner tube 4800 has a higher CTE value than the material of the bolt 4400. As such, upon heating the system, although the bolt 4400 increases in length, the higher CTE material of the inner tube 4800 expands more than the lower CTE material of the bolt 4400. The head 4410 of the bolt 4400 thereby remains within the counterbore 4322 of the journal 4300. In other words, expansion of the bolt 4400 results in an increased distance between the distal end 4630 of the bolt 4400 and the end bell 4200, but expansion of the inner tube 4800 maintains a secure connection between the sloped engagement surface 4310 of the journal 4300 and the sloped engagement surface 4212 of the end bell 4200 at all temperatures.

Figure 10:
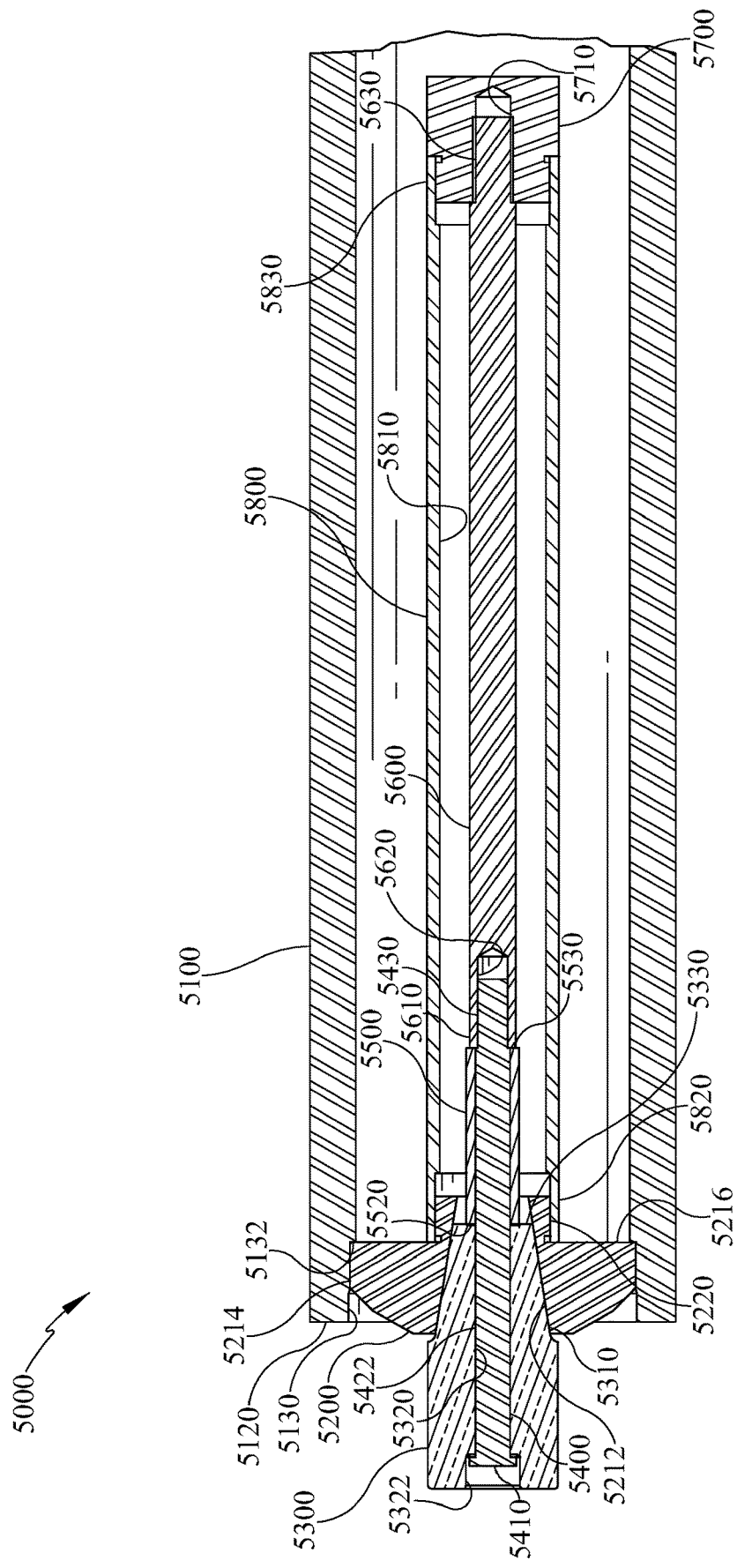
FIG. 10 is a cross-sectional view of a fifth exemplary embodiment of a system of the present invention in the form of a roll assembly.

Referring now to FIG. 10, another roll assembly 5000 of the present invention is similar to the roll assembly 4000 shown in FIG. 9 except the bolt does not directly connect to the cap, as discussed further below.

As shown in FIG. 10, the roll 5100 defines a cavity with an internal surface 5130 with an end 5120 of the roll 5100 which is open to the cavity. A lip 5132 is formed along the internal surface 5130 of the cavity a distance away from the end 5120 of the roll 5100.

An end bell 5200 sits against the lip 5132 within the cavity of the roll 5100. In particular, and similar to the end bell 4200 discussed above with respect to FIG. 9, the end bell 5200 includes an exterior surface 5214 which is positioned adjacent to the internal surface 5130 of the cavity of the roll 5100 with a leading surface 5216 of the end bell 5200 sitting against the lip 5132 of the roll 5100. However, in the embodiment shown in FIG. 10, extending from the leading surface 5216 of the end bell 5200 is a projection 5220. The end bell 5200 further defines a tapered cavity 5212 which extends through the end bell 5200, including through the projection 5220.

An inner tube 5800 is affixed to the projection 5220 of the end bell 5200. In particular, in the exemplary embodiment shown in FIG. 10, the projection 5220 of the end bell 5200 is positioned within an internal cavity 5810 of the inner tube 5800 at a first end 5820 of the inner tube 5800. The inner tube 5800 extends a distance away from the end bell 5200 substantially along the longitudinal axis of the roll 5100 with a cap 5700 affixed to a second end 5830 of the inner tube 5800 in substantially the same manner as the inner tube 4800 and cap 4700 described above with respect to FIG. 9.

A journal 5300 sits within the tapered cavity 5212 of the end bell 5200. More specifically, an external tapered surface 5310 of the journal 5300 is configured to mate with the tapered cavity 5212 of the end bell 5200. The journal 5300 further defines a counterbored through hole 5320 through which a bolt 5400 extends with the head 5410 of the bolt 5400 contained within the counterbore 5322 of the journal 5300. A shaft 5422 of the bolt 5400 extends from the head 5410 of the bolt 5400, through the through hole 5320 of the journal 5300 and into the internal cavity 5810 of the inner tube 5800.

An inner bar 5600 extends between the bolt 5400 and the cap 5700. In particular, a first end 5610 of the inner bar 5600 defines a cavity 5620 which accepts a distal end 5430 of the bolt 5400 and a second end 5630 of the inner bar 5600 is accepted within a cavity 5710 defined in the cap 5700.

A spacer 5500 also surrounds the bolt 5400 and extends between a distal end 5330 of the journal 5300 and the first end 5610 of the inner bar 5600. That is to say, a first end 5520 of the spacer 5500 is positioned adjacent to the distal end 5330 of the journal 5300 and a second end 5530 of the spacer 5500 is positioned adjacent to the first end 5610 of the inner bar 5600.

Similar to the embodiment described above with respect to FIG. 9, the various components can be connected by any means well known in the art, including but not limited to, threaded connections, shrink fittings, welding, and the like.

In operation, the bolt 5400 is used to hold the journal 5300 firmly within the end bell 5200. In a typical two-material CTE system in which a higher CTE bolt is used to directly connect a lower CTE journal to the roller, upon submerging a roller into a zinc pot, the bolt would extend in length more than the journal would expand, thereby loosening the connection of the journal to the roller.

As previously mentioned, the roll 5100 and the journal 5300 are both made of a material with a relatively low CTE, such as a ceramic. Each of the end bell 5200, bolt 5400, spacer 5500, inner bar 5600, cap 5700, and inner tube 5800 are made of materials have higher CTE values as compared to low CTE of the roll 5100 and journal 5300. Furthermore, the material of the inner tube 5800 has a higher CTE value than the material of the inner bar 5600. As such, upon heating the system, the higher CTE material of the inner tube 5800 expands more than the lower CTE material of the inner bar 5600. Therefore, although the second end 5630 of the inner bar 5600 and cap 5700 move away from the end bell 5200 due to the growth of the inner bar 5600, the distal end 5610 of the inner bar 5600 remains in substantially the same location relative to the end bell 5200.

Furthermore, the material of the spacer 5500 has a higher CTE value than the material of the bolt 5400. As such, upon increasing the temperature of the system, the higher CTE material of the spacer 5500 expands more than the relatively lower CTE material of the bolt 5400 to thereby account for any growth in the bolt 5400. Accordingly, the design of the present invention maintains a secure connection between the journal 5300 and the end bell 5200 at all temperatures.

Although only one end of the roll assemblies 4000, 5000 is shown and described above, it should be understood that the other end of the roll assemblies 4000, 5000 can be formed in substantially the same manner.

The systems shown in FIGS. 9 and 10 are merely exemplary of a roll system configured for submersion in a heated bath, such as a roller used in a galvanizing line assembly. While in some embodiments, the end bell, the inner tube, and/or the cap are all made of the same material (e.g., 316L steel), or materials each having a substantially similar CTE value, in some other embodiments, one or more of these components is made of a different element. A person of ordinary skill can readily choose the particular dimensions and CTE materials depending on the design considerations. Furthermore, it is contemplated that the present invention is also suitable for other metal coating system including, but not limited to, assemblies for the production of glavannealed steel, galvalum, and aluminized metals. Likewise, any application in which a bearing system is subjected to a heated environment would benefit from the roller system of the present invention.

As mentioned above, the materials used in each of the exemplary embodiments described above are not particularly limited and can be chosen by a person of ordinary skill to operate in accordance with the present invention based on the above descriptions. In some exemplary embodiments, one or more members (e.g., the low-level CTE members) are made of a material having a CTE value of about 0.000001 to 0.000004 (in/in/° F.), such as ceramics, zirconia, SiC, SN4, AlO3, or nickel. In some exemplary embodiments, one or more members (e.g., the high-level CTE members) are made of a material having a CTE value of about 0.000004 to 0.000010 (in/in/° F.), such as zirconia and carbon steels, stainless steel, or nickel alloys. In some exemplary embodiments, one or more members (e.g., the compensation members) are made of a material having a CTE value of about 0.000008 to 0.000020 (in/in/° F.), such as stainless steel and nonferrous metals like zinc, aluminum, copper, magnesium, manganese, or their alloys.

One of ordinary skill in the art will recognize that additional embodiments are possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system for securing objects having different coefficients of thermal expansion (CTE), the system comprising:
   a low-level CTE member having a first CTE, the low-level CTE member including an engagement surface;
   a high-level CTE member having a second CTE greater than the first CTE, the high-level CTE member including an engagement surface facing the engagement surface of the low-level CTE member;
   a compensation member positioned adjacent to the low-level CTE member and the high-level CTE member, the compensation member having a compensation CTE greater than the second CTE;
   wherein, when the system is heated, expansion of the low-level CTE member and the high-level CTE member results in an increased distance between the engagement surface of the low-level CTE member and the engagement surface of the high-level CTE member, and expansion of the compensation member maintains a secure connection between the low-level CTE member and the high-level CTE member;
   wherein the low-level CTE member includes
      a cylindrical body defining an internal cavity with a distal end of the body open to the internal cavity, and
      a journal extending away from the distal end of the cylindrical body, the journal having a sloped engagement surface and defining a through hole wherein the engagement surface of the low-level CTE member includes the sloped engagement surface of the journal;

wherein the high-level CTE member includes
an end bell positioned within the open distal end of the cylindrical body, the end bell defining a through hole and including a sloped engagement surface surrounding the through hole wherein the engagement surface of the high-level CTE member includes the sloped engagement surface of the end bell, and the sloped engagement surface of the journal is in contact with the sloped engagement surface of the end bell such that the through hole of the journal is aligned with the through hole of the end bell, and
a bolt including a head and a shaft extending from the head, the shaft extending through the through hole of the journal and through the through hole of the end bell, the shaft terminating in an end positioned within the internal cavity of the cylindrical body;

wherein the compensation member is positioned around the shaft of the bolt and operably connected to the end bell and the end of the shaft of the bolt such that the bolt and the compensation member maintain a secure connection between the sloped engagement surface of the journal and the sloped engagement surface of the end bell; and wherein, when the system is heated, expansion of the bolt results in an increased distance between the end of the shaft of the bolt and the end bell, and expansion of the compensation member maintains the secure connection between the sloped engagement surface of the journal and the sloped engagement surface of the end bell.

2. The system of claim 1, wherein the bolt includes:
a main body including the head of the bolt and a first portion of the shaft closest to the head; and
an extension body including a second portion of the shaft that includes the end of the shaft of the bolt, the extension body having a CTE less than the compensation CTE.

3. The system of claim 1, further comprising a cap, the cap connected to an end of the compensation member opposite from the end bell, and the cap connected to the end of the shaft of the bolt.

4. A roll assembly utilizing members having different coefficients of thermal expansion (CTE), comprising:
a cylindrical body having a first CTE, the body defining an internal cavity with a distal end of the body open to the internal cavity;
an end bell positioned within the open distal end of the body, the end bell defining a through hole and including a sloped engagement surface surrounding the through hole;
a journal positioned against the end bell with a sloped engagement surface of the journal in contact with the sloped engagement surface of the end bell, the journal defining a through hole aligned with the through hole of the end bell;
a bolt having a second CTE greater than the first CTE, the bolt including a head and a shaft extending from the head through the through hole of the journal and the through hole of the end bell, the shaft terminating in an end positioned within the internal cavity of the body; and
a compensation member having a compensation CTE greater than the second CTE, the compensation member positioned around the shaft of the bolt and operably connected to the end bell and the end of the shaft of the bolt such that the bolt and the compensation member maintain a secure connection between the sloped engagement surface of the journal and the sloped engagement surface of the end bell;

wherein, when the roll assembly is heated, expansion of the bolt results in an increased distance between the end of the shaft of the bolt and the end bell, and expansion of the compensation member maintains the secure connection between the sloped engagement surface of the journal and the sloped engagement surface of the end bell.

5. The roll assembly of claim 4, wherein the bolt includes:
a main body including the head of the bolt and a first portion of the shaft closest to the head, the main body having a CTE less than the compensation CTE; and
an extension body including a second portion of the shaft that includes the end of the shaft of the bolt, the extension body having a CTE less than the compensation CTE.

6. The roll assembly of claim 5, further comprising a spacer having a CTE greater than the CTE of the main body of the bolt, the spacer surrounding the first portion of the shaft of the bolt and positioned and compressed between the second portion of the shaft and the journal such that, when the roll assembly is heated, expansion of the main body of the bolt results in an increased distance between the second portion of the shaft of the bolt and the journal, and expansion of the spacer maintains the compression of the spacer between the second portion of the shaft and the journal.

7. The roll assembly of claim 4, further comprising a cap connected to an end of the compensation member opposite from the end bell, the cap connected to the end of the shaft of the bolt.

* * * * *